(12) United States Patent
Kawaguchi et al.

(10) Patent No.: US 6,234,904 B1
(45) Date of Patent: May 22, 2001

(54) DRIVE POWER TRANSMISSION APPARATUS

(75) Inventors: Masahiro Kawaguchi; Hirohiko Tanaka; Akifumi Uryu; Masahiko Okada, all of Kariya (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 0 days.

(21) Appl. No.: 09/477,581

(22) Filed: Jan. 4, 2000

(30) Foreign Application Priority Data

Jan. 14, 1999 (JP) .................................................. 11-007768

(51) Int. Cl.[7] .................................................... F04B 49/00
(52) U.S. Cl. ......................... 464/30; 192/56.5; 417/223
(58) Field of Search .................................. 464/30, 57, 58, 464/59, 60, 77; 192/55.1, 55.5, 55.51, 56.5, 56.1; 417/223; 418/69

(56) References Cited

U.S. PATENT DOCUMENTS

| | | | | |
|---|---|---|---|---|
| 2,563,112 | * | 8/1951 | Hill et al. ............................ | 464/23 X |
| 2,637,987 | * | 5/1953 | Hill et al. ......................... | 192/56.1 X |
| 4,287,974 | * | 9/1981 | Krejci .................................. | 192/56.5 |
| 4,317,253 | * | 3/1982 | Gut et al. ......................... | 192/56.1 X |
| 4,480,736 | * | 11/1984 | Loizeau ............................... | 464/57 X |
| 5,391,058 | * | 2/1995 | Goto et al. ........................... | 417/223 |
| 5,683,299 | * | 11/1997 | Kishibuchi et al. ............ | 192/55.1 X |
| 6,015,349 | * | 1/2000 | Okada et al. ................... | 417/223 X |
| 6,068,452 | * | 5/2000 | Okada et al. ....................... | 417/223 |
| 6,077,048 | * | 6/2000 | Okada et al. ....................... | 417/223 |

FOREIGN PATENT DOCUMENTS 11-230189    8/1999   (JP) .

* cited by examiner

Primary Examiner—Rodney H. Bonck
(74) Attorney, Agent, or Firm—Woodcock, Washburn Kurtz Mackiewicz & Norris LLP

(57) ABSTRACT

A drive power transmission apparatus including a torsionally deformable spring capable of being torsionally deformed so as to permit a relative rotation between a rotor element and a drive shaft in response to a change in a load torque appearing in a drive-power-receiving unit, a releasing element operable to move the free outer end of the torsionally deformable spring from the power transmitting face of the rotor element when the relative rotation between the rotor element and the drive shaft increases due to an increase in the load torque beyond a predetermined limiting torque, and a mechanical elevation arranged in the rotor element for permitting the free outer end of the torsionally deformable spring to ride thereon to thereby promote separation of the spiral spring from the rotor element in order to interrupt the transmission of drive power.

10 Claims, 11 Drawing Sheets

ROTATING DIRECTION

ROTATING DIRECTION →

ROTATING DIRECTION

DRIVE POWER TRANSMISSION APPARATUS

BACKGROUND OF THE INVENTION

1. Field of the Invention

The present invention generally relates to a drive power transmission apparatus disconnectably connecting a first rotating element on the side of a drive power source with a second rotating element on the side of a drive-power-receiving unit for transmitting a drive power from the first rotating element to the second rotating element. More particularly, the present invention relates to a drive power transmission apparatus, not exclusively, but preferably, arranged between a vehicle engine and a vehicle auxiliary unit, such as a refrigerant compressor of a vehicle refrigerating system, and accommodating therein a transmission-interrupting mechanism for interrupting the transmission of a drive power from the vehicle engine to the auxiliary unit to stop the operation of the auxiliary unit when an excessive load appears in the auxiliary unit due to an unpredictable trouble of the auxiliary unit, in order to eventually prevent the excessive load being transmitted to the vehicle engine.

2. Description of the Related Art

The pending U.S. patent application Ser. No. 09/208,383 assigned to the Assignee of the present application discloses a drive power transmission apparatus with a transmission interrupting means. The disclosed drive power transmission apparatus includes a power transmission-pulley-assembly 100 having a torque limiter, as shown in the attached FIGS. 8 through 12.

As shown in FIGS. 8 and 9, the power transmission-pulley-assembly 100 includes a rotor element 101 rotatably supported on a front housing 201 of a refrigerant compressor and having an axis of rotation corresponding to an axis "L" shown in FIG. 8 about which the power transmission-pulley-assembly 100 rotates. The rotor element 100 is operatively connected to a vehicle engine 202 via a transmission belt 203 wound around both the rotor element 101 and a pulley mounted on an output shaft of the vehicle engine.

The rotor element 101 is provided with an annularly extending inner cavity 101a and spring catches 102 formed therein to be arranged in the inner cavity 101a. Each of the spring catches 102 has a portion thereof projecting from the inner cavity 101a and an engaging recess 103 recessed in an end face of the spring catch 102, i.e., in a front face thereof in a predetermined rotating direction of the power transmission-pulley-assembly 100, indicated by an arrow in FIG. 9. The engaging recess 103 is formed to extend from the inside of the inner cavity 101a toward the outside of the inner cavity 101a. The engaging recess 103 of each spring catch 102 opens in a radial direction of the power transmission-pulley-assembly 100 and is closed by walls in a direction parallel to the axis "L". The engaging recess 103 has an engaging end face 103a formed in the inner cavity 101a as a face through which a power is transmitted from the rotor element 101 to a later-described spiral spring 104. The engaging end face 103a of the engaging recess 103 is arranged to direct forwardly with respect to the rotating direction of the power transmission-pulley-assembly 100. One of the walls of the engaging recess 103 is formed as a blocking face 103b facing toward the inside of the inner cavity 101a, i.e., facing in a direction from the left to right hand along the axis "L" in FIG. 8.

The power transmission-pulley-assembly 100 is further provided with a pair of spiral springs 104 arranged between the rotor element 101 and a drive shaft 204 of the refrigerant compressor. Each spiral spring 104 has an outer end 104a which is received in the engaging recess 103 of the spring catch 102 so as to be abutted against the engaging end face 103a thereof. The inner end 104b of the spiral spring 104 is fixed to the drive shaft 204 in a region outside the inner cavity 101a of the rotor element 101.

The spiral springs 104 shown in FIG. 11 are placed in a free condition where the springs 104 recover their basic position lying in a flat plane which is vertical to the axis "L" and is located in front of the rotor element 101 in a direction of the axis "L", so that the outer end 104a thereof is detached from the spring catch 102. Thus, when the power transmission-pulley-assembly 100 is assembled on the front end of the refrigerant compressor, the spiral spring 104 is elastically deformed in the direction of the axis "L" so that the outer end 104a thereof is moved rearward from the above-mentioned flat plane with respect to the inner end 104b so as to be engaged in the engaging recess 103 of the spring catch 102, as shown in FIG. 8. When the outer end 104a of the spiral spring 104 is engaged in the engaging recess 103 of the spring catch 102, the outer end 104a is elastically urged frontward in a direction along the axis "L" to come into contact with the blocking face 103b, so that an elastic force is produced and stored in the spiral spring 104.

A disconnecting plate 105 of the power transmission-pulley-assembly 100 is fixed to the drive shaft 204 and arranged axially in front of the spiral spring 104 along the axis "L". The disconnecting plate 105 is provided with a pair of circularly elongated projections 105a formed therein and functioning as a releasing means for permitting the outer end 104a of the spiral spring 104 to be disengaged from the engaging recess 103 of the spring catch 102. The disconnecting plate 105 is fixedly mounted on the drive shaft 204 so that each of the pair of circularly elongated projections 105a is shifted circumferentially in the rotating direction of the transmission-pulley-assembly 100 with respect to the corresponding one of the pair of spring catches 102.

A drive power from the vehicle engine 202 is transmitted to the drive shaft 204 via the transmission belt 203, the rotor element 101, the engaging end face 103a of the spring catch 102, and the spiral spring 104 having the outer and inner ends 104a and 104b. As soon as the drive power is transmitted to the drive shaft 204 to rotate it in the predetermined rotating direction shown in FIG. 9, the drive shaft 204 is subjected to a load torque in a direction reverse to the predetermined rotating direction thereof. The load torque applied to the drive shaft 204 causes torsion of the spiral spring 104, so that the rotor element 101 is relatively shifted circumferentially with respect to the drive shaft 204 in a direction corresponding to the predetermined rotating direction of the drive shaft 204. Thus, each of the spring catches 102 integral with the rotor element 101 approaches the corresponding releasing projection 105a of the disconnecting plate 105 fixed to the drive shaft 204.

When the above-mentioned load torque is smaller than a predetermined limiting torque, an amount of torsion of the spiral spring 104 is kept small and accordingly, the relative amount of shift between the rotor element 101 and the drive shaft 204 is also kept small. Thus, although the releasing projections 105a of the disconnecting plate 105 are shifted to positions close to or in contact with the outer ends 104a of the spiral springs 104, the contacting force acting between the outer ends 104a of the spiral springs 104 and the releasing projections 105a is not large enough to release a mechanical engagement of the outer ends 104a of the spiral springs 104 with the rotor element 101 via the engaging end face 103a of the spring catch 102. Therefore, the outer ends 104a of the spiral springs 104 are engaged in the engaging recesses 103 of the spring catch 102 so that the outer ends 104a are kept in touch with the engaging end face 103a. Accordingly, the transmission of the drive power from the vehicle engine 202 to the drive shaft 204 continues. A change in the load torque can be absorbed by the torsion of the spiral springs 104 so long as the changed load torque exceeds the predetermined limiting torque.

On the other hand, when the load torque excessively increases to exceed the predetermined limiting torque due to an unpredictable cause appearing in the refrigerant compressor, the amount of torsion of the spiral spring 104 is increased to extend the relative shift between the rotor element 101 and the drive shaft 204 in the rotating direction of the drive shaft 204. Thus, the releasing projections 105*a* of the disconnecting plate 105 come into strong contact with the outer ends 104*a* of the spiral springs 104 to apply a large pressing force to the outer ends 104*a* of the spiral springs 104. Thus, the engaging end faces 103*a* of the spring catches 102, which have an inclination from a radial direction (see FIG. 10), cause an increase in a radially inward force applied by the releasing projections 105*a* to the outer ends 104*a* of the spiral springs 104 so that the outer ends 104*a* of the spiral springs 104 are moved radially inwardly by the guidance of the inclined engaging end faces 103*a* until the outer ends 104*a* are disengaged from the engaging end faces 103*a* of the spring catches 102, as best shown in FIG. 10. As a result, the elastic force stored in the spiral springs 104 is removed. Namely, the spiral springs 104 are moved away and released from the engagement with spring catches 102 of the rotor element 101 and accordingly, the spiral springs 104 recover the free condition shown in FIG. 11 in which they lie in the flat plane perpendicular to the axis "L". Therefore, the outer ends 104*a* of the spiral springs 104 are detached from the engaging end faces 103*a* of the spring catches 102 in the direction toward the disconnecting plate 105. Thus, the spiral springs 104 are completely disconnected from the rotor element 101, so that the transmission of the drive power from the side of the rotor element 101 of the power transmission-pulley-assembly 100 to the drive shaft 204 of the side of the refrigerant compressor is interrupted to prevent the excessive load torque from being transmitted from the side of the refrigerant compressor to the side of the vehicle engine 202.

Nevertheless, in the described conventional power transmission-pulley-assembly 100, each of the spiral springs 104 having its maximum radius R1 (a radial distance between the axis "L" and an outermost edge portion of the outer end 104*a* located farthest from the axis "L") which is larger than the radius R2 of the outer wall portion of the annular rotor cavity 101*a* of the rotor element 101 (see FIG. 11) is intendedly or unintendedly used depending on the design requirement of the power transmission-pulley-assembly 100. Therefore, the outer diameter of the spiral springs 104 must be forcedly and elastically reduced when the spiral springs 104 are assembled in the rotor cavity 101*a* of the rotor element 101 in a manner such that the outer ends 104*a* of the spiral springs 104 are in touch with the engaging end faces 103*a* of the spring catches 102 of the rotor element 101. Therefore, when the load torque applied by the refrigerant compressor increases to exceed the predetermined limiting torque to resultingly cause an increase in the radially inward force applied to the spiral springs 104 from the releasing projections 105*a* of the disconnecting plate 105, a movement of the spiral springs 104 to come out of the rotor cavity 101*a* of the rotor element 101 occurs. Namely, the reduced outer diameter of the spiral springs 104 is elastically allowed to recover the initial outer diameter while permitting the outer ends 104*a* of the spiral springs 104 to be moved axially forward by the guidance of the inner wall surface 101*b* of the rotor element 101, and finally the outer ends 104*a* of the spiral springs 104 are moved away and separated from the rotor cavity 101*a* of the rotor element 101.

Nevertheless, as shown in FIGS. 12A and 12B, the conventional spiral springs 104 must encounter the defects described hereinbelow. Namely, when the spiral springs 104 are assembled in the engaging recesses 103 of the spring catches 102 of the rotor element 101, they might either fail to produce a sufficient elastic force in the axially forward direction to cause a disengagement thereof from the spring catches 102 or may generate a large frictional force in a portion contacting with the inner wall surface 101*b* of the rotor cavity 101*a*. Thus, the outer ends 104*a* of the spiral springs 104 cannot be completely moved away from the rotor cavity 101*a* of the rotor element 101 even when the load torque exceeds the predetermined limiting torque. As a result, the outer ends 104*a* of the spiral springs 104 are still left in touch with and frictionally slide along the inner wall surface 101*b* of the rotor cavity 101*a* to generate noise and vibration during the relative shifting of the rotor element 101 in the circumferential direction with respect to the drive shaft 204. Further, each of the outer ends 104*a* of the spiral springs 104 might come into re-engagement with the engaging recess 103 of the spring catch 102 which is different from the initially engaged spring catch 102, due to the relative shifting of the rotor element 101 in the circumferential direction with respect to the drive shaft 204, and therefore, the power transmission-pulley-assembly 100 cannot surely prevent an excessive load torque from being transmitted from the side of the refrigerant compressor to the side of the vehicle engine 202.

SUMMARY OF THE INVENTION

A primary object of the present invention is to obviate the above-mentioned defects encountered by the conventional drive power transmission apparatus including the power transmission-pulley-assembly.

Another object of the present invention is to provide a drive power transmission apparatus incorporating therein an interrupting means functioning to interrupt the transmission of an excessive load from a drive-power applied side to a drive-power applying side and an additional internal mechanism capable of accurately operating the interrupting means when the excessive load appears.

In accordance with the present invention, there is provided a drive power transmission apparatus for transmitting a drive power from a drive power source to a rotation-receiving unit by operatively connecting a first rotatable element provided for the drive power source and a second rotatable element provided for the rotation-receiving unit to be coaxial with the first rotatable element, which comprises:

a power-transmitting face formed in a preselected one of the first and second rotatable elements to face toward a predetermined rotating direction of the preselected rotatable element;

a torsionally deformable spring element provided with a first outer end arranged to be in a contact engagement with the power-transmitting face of the preselected rotatable element and a second outer end fixedly connected to the other of the first and second rotatable elements, the torsionally deformable spring element being torsionally deformed by a load torque appearing in the drive-power-receiving unit during transmission of the drive power while permitting a relative rotation between the first and second rotatable elements;

an urging force applying means operative to apply an urging force to the first outer end of the torsionally deformable spring element in a direction to disengage the first outer end from the power-transmitting face;

a blocking face formed in the preselected rotatable element to block the first outer end of the torsionally deformable spring element when the first outer end is urged by the urging force applying means to be disengaged from said power-transmitting face;

a force releasing means for releasing the urging force of the urging force applying means when the load torque exceeds a predetermined limiting value, said force releasing means encouraging the torsionally deformable spring element to be torsionally deformed until the first outer end thereof is disengaged from the blocking face when the load torque exceeds the predetermined limiting value; and an elevation arranged in the preselected rotatable element for permitting the torsionally deformable spring element to ride thereon in response to the relative rotation between the first and second rotatable elements when the first outer end being disengaged from the blocking face cannot be separated from the preselected rotatable element by the urging force of the urging force applying means to thereby promote separation of the first outer end of the torsionally deformable spring element from the preselected rotatable element.

Preferably, the first rotatable element comprises a rotor element supported on a portion of the drive-power-receiving unit to be rotatable about an axis of rotation and provided with an outer annular rim operatively connected to the drive power source to receive the drive power and a rotor cavity formed therein and enclosed by an inner cylindrical wall surface and, the second rotatable element comprises an intermediate member connected to a rotation-driven element of the drive-power-receiving unit and having a spring connecting portion to which the second outer end of the torsionally deformable spring is fixedly connected.

Then, the drive power transmission apparatus may comprise at least one engaging element separate from and fixed to the rotor element of the first rotatable element, the engaging element being provided with at least the power-transmitting face and the blocking face formed therein, the power-transmitting face formed so as to permit the drive power of the rotor element to be transmitted to the rotation-driven element via the torsionally deformable spring when the load torque is less than the predetermined limiting value.

The engaging element is further provided with the elevation integrally formed therein as a geometrically elevated portion having a face on which the torsionally deformable spring element rides.

Alternatively, the elevation may be arranged in the rotor cavity of the rotor element of the first rotatable element at a position spaced apart from the engaging element in a direction reverse to the predetermined rotating direction of the rotor element, the elevation comprising a geometrically elevated portion formed integrally with the rotor element and provided with an inclined guide face permitting the torsionally deformable spring element to gradually ascend the inclined guide face of the elevated portion in response to the relative rotation between the rotor element of the first rotatable element and the intermediate member connected to the rotation-driven element.

BRIEF DESCRIPTION OF THE DRAWINGS

The above and other objects, features and advantages of the present invention will be made more apparent from the ensuing description of preferred embodiments thereof with reference to the accompanying drawings wherein.

DESCRIPTION OF THE PREFERRED EMBODIMENTS

Figure 1:
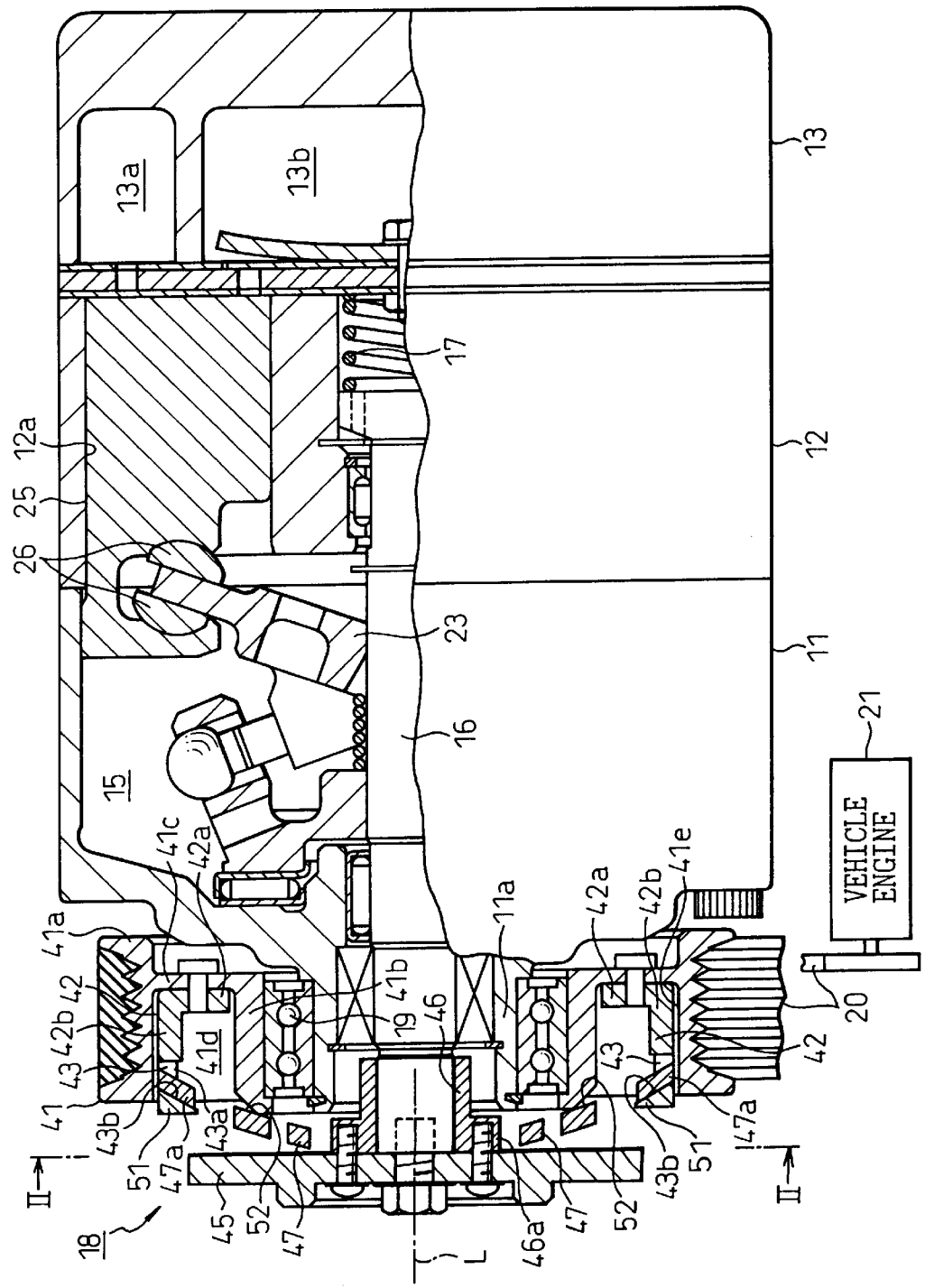
FIG. 1 is a longitudinal view, in part broken away, of a refrigerant compressor on which a drive power transmission apparatus according to a first embodiment of the present invention is mounted.

The description of the first and second embodiments of the present invention will be provided hereinbelow on the basis of an example in which the drive power transmission apparatus is arranged between a vehicle engine and a refrigerant compressor of a vehicle refrigerating system. However, it should be understood that the drive power transmission apparatus might be alternatively arranged between a vehicle engine and any one of various auxiliary units assembled in the vehicle and receiving a drive power from the vehicle engine. Throughout the first and second embodiments, similar or like elements are designated by the same reference numerals.

The description of a refrigerant compressor forming a drive-power receiving unit will be first provided below.

Referring to FIG. 1, a refrigerant compressor constructed as a swash plate type piston-operated refrigerant compressor is provided with a front housing 11 sealingly connected to a front end of a cylinder block 12, and a rear housing 13 sealingly connected to a rear end of the cylinder block 12. The front housing 11 and the cylinder block 12 define therebetween an inner cavity used as a crank chamber 15 in which an axial drive shaft 16 extends so as to be rotatably supported by the front housing 11 and the cylinder block 12 via two axially spaced apart bearings. The drive shaft 16 has a front end which axially outwardly extends through a front wall of the front housing 11 and is surrounded by a front boss 11a formed in a frontmost portion of the front housing 11.

A drive power transmission apparatus including a drive-power transmitting pulley assembly 18 having a torque-limiting function is rotatably mounted on an outer circumference of the boss 11a via an angular contact type bearing 19. The drive-power-transmitting pulley assembly 18 (it will be simply referred to as a pulley assembly 18 hereinafter.) is operatively connected to the drive shaft 16 and arranged to be coaxial with the drive shaft 16. The pulley assembly 18 is directly connected to a vehicle engine 21, forming a drive power source, via a transmission belt 20 without the interposition of any clutch mechanism such as a solenoid clutch. Therefore, when the vehicle engine 21 is started, the pulley assembly 18 receives a drive power from the vehicle engine 21 via the transmission belt 20 to rotationally drive the drive shaft 16 of the refrigerant compressor.

The refrigerant compressor is further provided with a swash plate 23 mounted on the drive shaft 16 to be rotatable together with the drive shaft 16 within the crank chamber 15. The swash plate 23 in the shape of a round plate has an outer periphery operatively connected, via shoes 26, to a plurality of pistons 25 which are slidably fitted in a plurality of cylinder bores 12a axially bored in the cylinder block 12. Thus, the rotation of the drive shaft 16 and the swash plate 23 is converted into a reciprocal sliding-motion of the pistons 25 in the cylinder bores 12a. The reciprocal sliding-motion of the pistons 25 causes suction, compression and discharge of a refrigerant gas.

A spring 17 consisting of a coil spring is arranged between a rearmost end (the right-hand end in FIG. 1) of the drive shaft 16 and the rear end of the cylinder block 12, and resiliently urges the drive shaft 16 in a frontward direction along an axis "L" about which the drive shaft 16 rotates, so that any play, among all the internal elements, left during the assembly of these elements in the refrigerant compressor is resiliently removed. The rear housing 13 is internally provided with a suction chamber 13a for a refrigerant gas before compression and a discharge chamber 13b for the refrigerant gas after compression.

The description of the pulley assembly 18 will be provided below.

Figure 2:
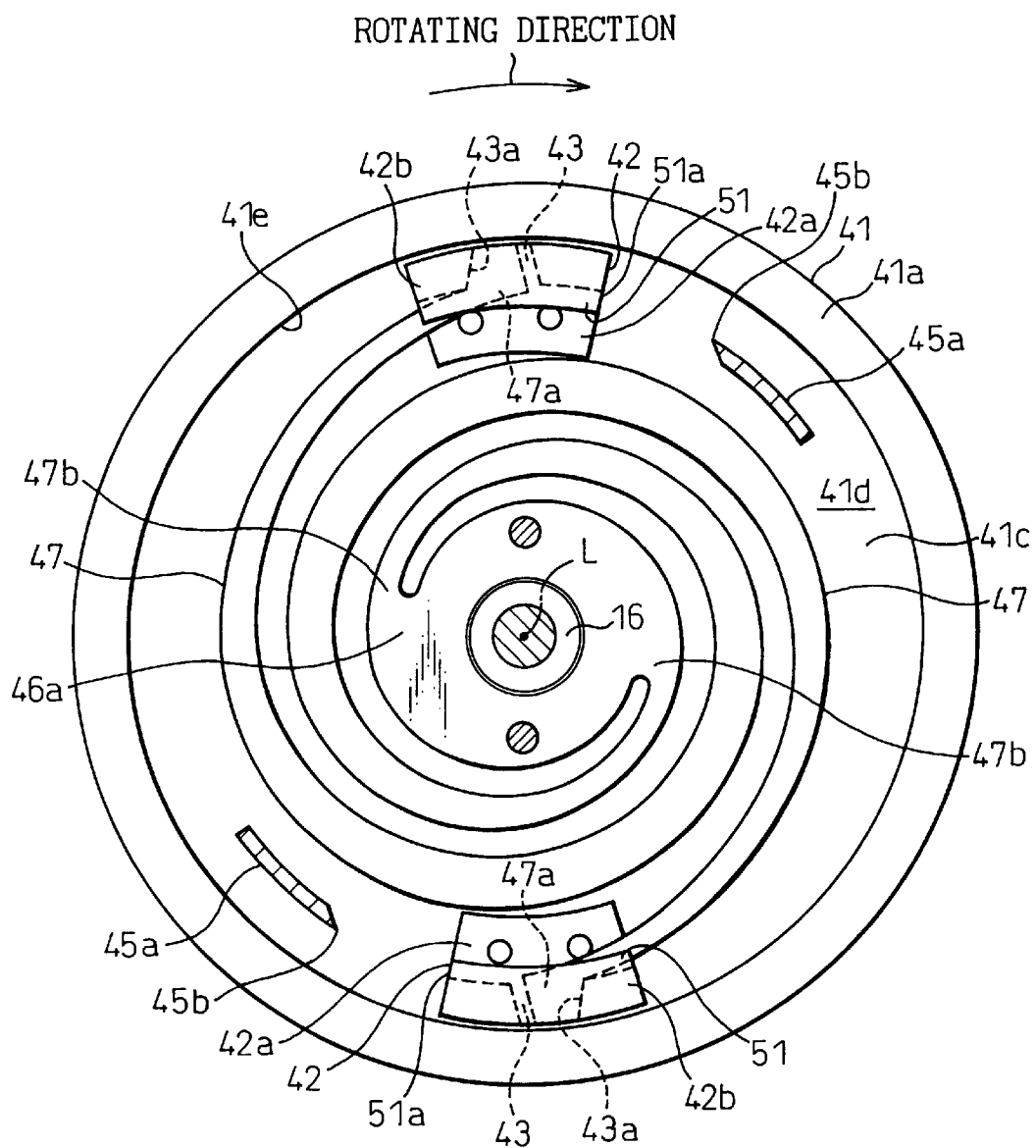
FIG. 2 is a cross sectional view taken along the line II—II of FIG. 1, illustrating a rotor element and spiral springs assembled in the drive power transmission apparatus of FIG. 1.

Referring to FIGS. 1 and 2, the pulley assembly 18 includes a rotor element 41 forming a first rotatable element of the drive power transmission apparatus. The rotor element 41 includes an outer annular rim 41a formed in an outermost portion thereof, an inner annular rim 41b coaxial with the outer rim 41a, and an annular disc portion 41c connecting the outer and inner rims 41a and 41b. The rotor element 41 is fixedly mounted on the outer race of the angular contact type bearing 19 via the inner annular rim 41b. The transmission belt 20 is wound around the outer annular rim 41a of the rotor element 41 and a pulley element connected to the vehicle engine 21 so as to transmit the drive power from the vehicle engine 21 to the rotor element 41.

The rotor element 41 is internally provided with a rotor cavity 41d defined between the outer and inner annular rims 41a and 41b formed as an annular cavity extending around the axis "L", which corresponds to an axis of rotation of the drive shaft 16 and having an axially front open end and an axially rear end closed by the annular disc portion 41c.

A pair of engaging elements 42 is arranged in the rotor cavity 41d of the rotor element 41 at diametrically opposite positions. Namely, the pair of engaging elements 42 are arranged to be spaced 180° apart from one another in a circumferential direction. Each of the engaging elements 42 includes a base portion 42a attached to an outermost portion of the annular disc portion 41c, and a wall portion 42b extending axially from an outer periphery of the base portion 42a so as to form a L-shape cross-section as shown in FIG. 1. The wall portion 42b of each engaging element 42 extends in parallel with an inner wall of the outer annular rim 41a of the rotor element 41. Each engaging element 42 is provided with an engaging recess 43 recessed in the wall portion 42b. The engaging recess 43 is formed so as to open in a radially inward direction of the pulley assembly 18 and to be closed in its circumferential direction corresponding to the rotating direction of the pulley assembly 18 and in its axial direction in parallel with the axis "L". Thus, each engaging element 42 is provided with an end face 43a (FIG. 2) formed in the engaging recess 43 to be used as a specific face to transmit a drive power, and a different end face 43b (FIG. 1) formed in the engaging recess 43 to be used as another specific face to block a later-described movement of spiral springs 47. The two end faces 43a and 43b will be hereinafter referred to as a power-transmitting face and a blocking face, respectively. Each power-transmitting face 43a is arranged to face toward a direction corresponding to the rotating direction of the pulley assembly 18, and is inclined with respect to a radial direction so that the engaging recess 43 is widened radially inwardly as best shown in FIG. 2. Each blocking face 43b is arranged to face generally toward an axially rearward direction parallel with the axis "L" as best shown in FIG. 1.

The pulley assembly 18 further includes a bush member 46 fixedly fitted on the frontmost portion of the drive shaft 16, and a disconnecting plate 45 fixed to the frontmost end of the drive shaft 16 at a position in front of the bush member 46. The bush member 46 is provided with a flange portion 46a formed in a front-end portion thereof and is located axially outside the end of the rotor element 41. The drive shaft 16, the disconnecting plate 45 and the bush member 46 are rotatable together, and form a second rotatable element of the drive power transmission apparatus.

The disconnecting plate 45 is provided with a pair of releasing projections 45a formed as a circularly elongated projections projecting axially rearward from a rear end face thereof into the rotor cavity 41d of the rotor element 41 and arranged at two diametrically opposite positions about the axis "L" and spaced from the axis "L". Each of the releasing projections 45a has a working end 45b at one of its opposite ends. As shown in FIG. 2, the disconnecting plate 45 fixed to the drive shaft 16 is arranged so that the working end 45b of each of the pair of releasing projections 45a is shifted from the engaging element 42 a predetermined amount in a circumferentially forward direction with respect to the rotating direction of the pulley assembly 18 and substantially lies in a plane extending through the engaging recess 43 of the engaging element 42. Thus, if the disconnecting plate 45 is relatively rotated with respect to the rotor element 41 so as to permit the releasing projections 45a to be moved toward the engaging elements 42, the working end 45b of each releasing projection 45a is disposed at a position adjacent to the inner faces of the wall portion 42b and the power transmitting face 43a of the engaging element 42.

The pulley assembly 18 further includes a pair of identical spiral springs 47 formed as a pair of torsion springs. Each spiral spring 47 has an outer end (a first end) 47a and an inner end (a second end) 47b. The inner end (the second end) 47b is connected to the flange portion 46a of the bush member 46. Therefore, the inner end 47b of the spiral spring 47 is connected to the drive shaft 16 at a position axially outside the rotor cavity 41d of the rotor element 41. The two spiral springs 47 are arranged to be circumferentially shifted 1800 from one another. Therefore, the outer ends 47a of the two spiral springs 47 are shifted 180° from one another about the axis "L", and similarly, the inner ends 47b of the spiral springs 47 are shifted 180° from one another about the axis "L".

As shown in FIG. 2, each of the spiral spring 47 is formed so as to spirally extend from the outer end 47a to the inner end 47b in a counterclockwise direction. Therefore, when a clockwise force is applied to the outer end 47a of the spiral spring 47 having the inner end 47b fixed to the drive shaft 16, the spiral spring 47 is spirally and elastically deformed so as to reduce its outer diameter. The outer end 47a of each spiral spring 47 is formed as an radially outward projection and is received in the engaging recess 43 of each engaging element 42 and is in touch with the power transmitting face 43a. Thus, each of the spiral springs 47 is disposed to receive the drive force from the rotor element 41 via the power transmitting face 43a of the engaging element 42.

Figure 5:
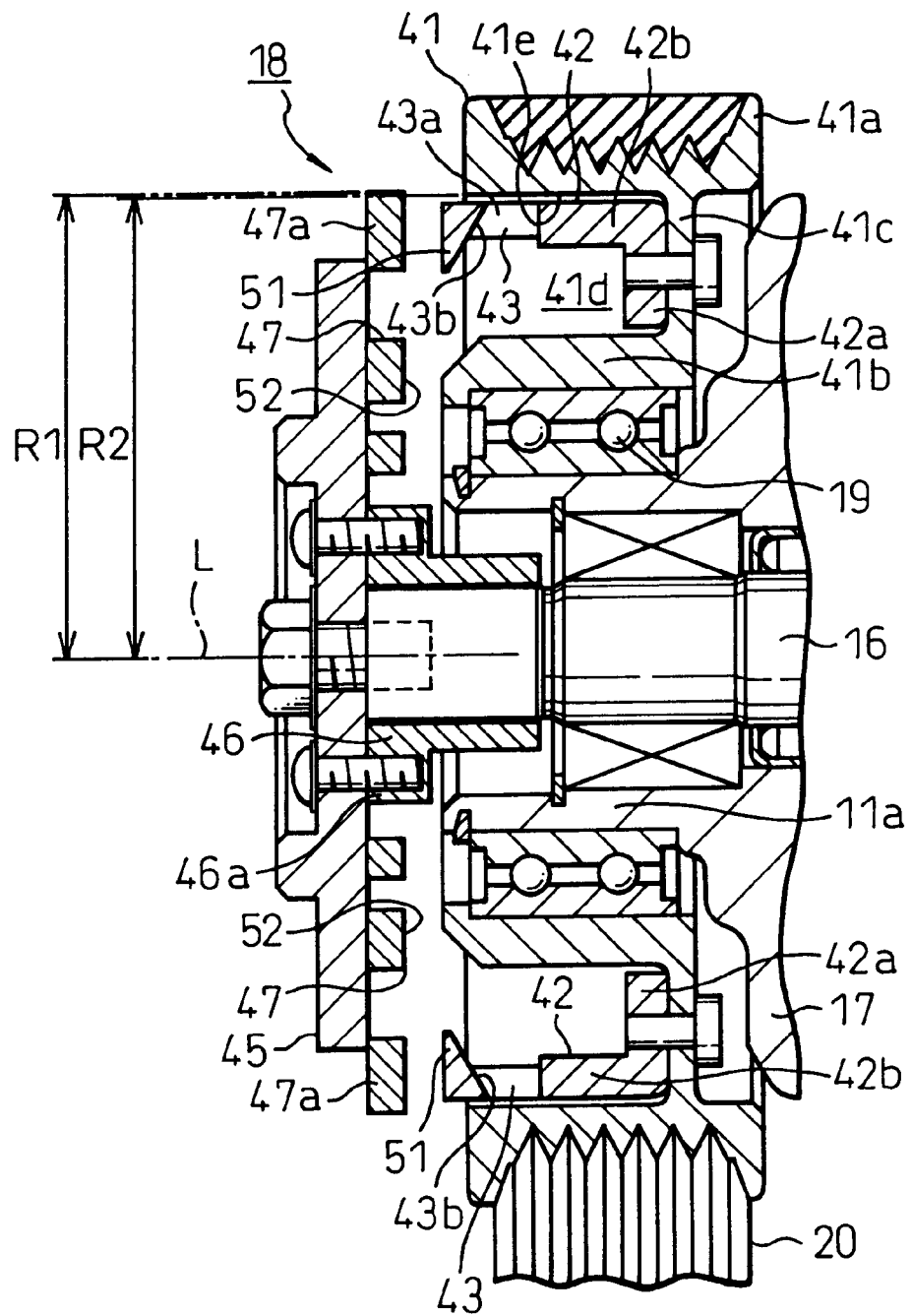
FIG. 5 is a cross-sectional view of the drive power transmission apparatus of the first embodiment, illustrating a specific condition in which the transmission of a drive power from the vehicle engine to the drive shaft of the refrigerant compressor is interrupted.

The spiral spring 47 held in an unrestrained free condition recovers its basic position as shown in FIG. 5 while lying in a flat plane. In the free condition of the spiral spring 47, the outer end 47a thereof is moved away from the engaging recess 43 of the engaging element 42 toward a position axially outside the rotor cavity 41d of the rotor element 41. Therefore, when the pulley assembly 18 is assembled, the spiral springs 47 are elastically deformed by moving it in an axially rearward direction along the axis "L" away from the above-mentioned flat plane. Thus, the outer ends 47a of the pair of spiral springs 47 are engaged in the associated engaging recesses 43 of the associated engaging elements 42, respectively. When spiral springs 47 are elastically deformed in the axially rearward direction along the axis "L" to be engaged in the engaging element 42 of the rotor element 41, an elastic force is produced and stored in the respective spiral springs 47, so that the spiral springs 47 form an urging force applying means to apply a force to constantly urge the outer ends 47a in an axially frontward direction along the axis "L" until they are in strong contact with the blocking faces 43b of the engaging recesses 43 of the engaging elements 42.

As best shown in FIG. 5, in an actual use, when the spiral springs 47 are held in the unrestrained free condition, a maximum radius R1 (a radial distance between the axis "L" and an outermost edge of the outer end 47a located farthest from the axis "L") of each of the pair of spiral springs 47 is formed to be equal to or larger than the radius R2 of the rotor cavity 41d of the rotor element 41. Therefore, the spiral springs 47 are engaged in the engaging recesses 43 of the respective engaging elements 42 after they are elastically deformed to reduce their diameters.

When the pulley assembly 18 is mounted on the front end of the refrigerant compressor, and when vehicle engine 21 is operated, a drive power from the vehicle engine 21 is transmitted to the drive shaft 16 via the transmission belt 20, the rotor element 41, the engaging element 42, the spiral springs 47 and the bush member 46. As soon as the drive power is transmitted to the drive shaft 16 to rotate it in a predetermined direction, a load torque in a direction reverse to the predetermined rotating direction of the drive shaft 16 applied to the drive shaft 16. Accordingly, the spiral springs 47 arranged between the drive shaft 16 and the rotor element 41 are torsionally deformed.

Figure 3:
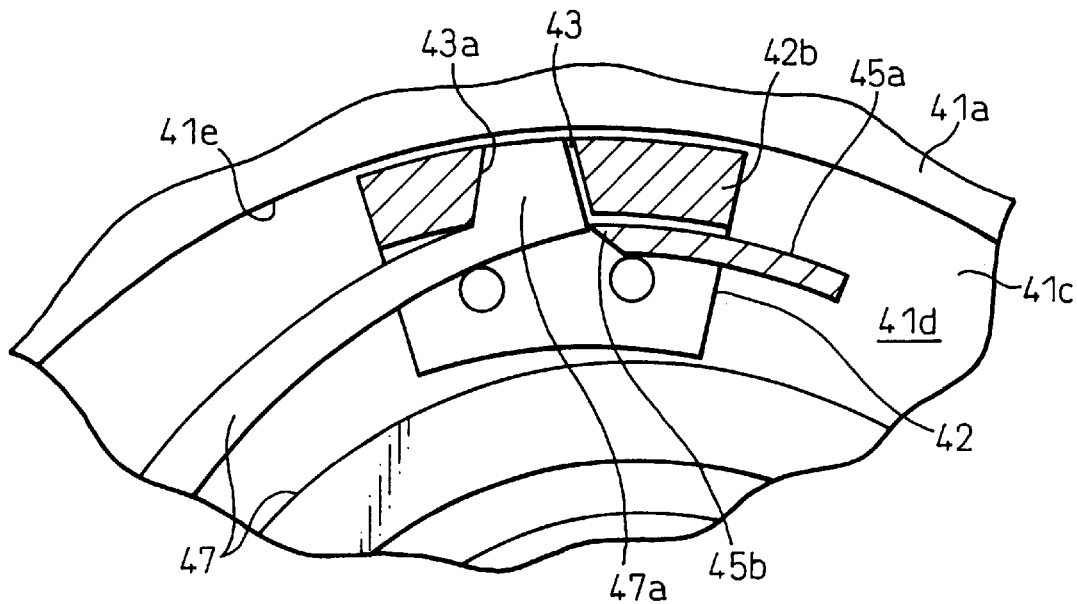
FIG. 3 is an enlarged partial view of the drive power transmission apparatus of the first embodiment, illustrating a process of the interrupting operation thereof.

Referring to FIG. 3, when the above-described load torque is maintained to be less than a predetermined limiting value, the torsional deformation of the spiral springs 47 is kept small. Therefore, a reduction in the diameter of the spiral springs 47 is small and, accordingly, a force acting on the outer ends 47a of the spiral springs 47 in a direction to radially inwardly move the outer ends 47a is kept small. Further, a radially inward force applied from the inclined power transmitting face 43a of the engaging element 42 to the outer ends 47a of the spiral springs 47 due to a torque transmitted from the inclined power transmitting face 43a to the outer ends 47a of the spiral springs 47 (the torque is proportional to the above-mentioned load torque) is also kept small. Moreover, since an amount of relative rotation between the rotor element 41 and the drive shaft 16 is small, the working ends 45b of the releasing projections 45a of the disconnecting plate 45 is held to be either spaced away from or in slight contact with the outer ends 47a of the spiral springs 47. Namely, an appreciably large pressing force is not applied from the releasing projections 45a to the outer ends 47a of the spiral springs 47. Therefore, the outer ends 47a of the spiral springs 47 are not disengaged from the power transmitting faces 43a of the engaging elements 42 and are maintained to be in touch with the power transmitting faces 43a. Therefore, the drive power is constantly transmitted from the vehicle engine 21 to the drive shaft 16 of the refrigerant compressor. During the constant transmission of the drive power to the drive shaft 16, a change in the load torque appearing in the refrigerant compressor, which does not allow the changed load torque to exceed the predetermined limiting value, is absorbed by the torsion of the spiral springs 47.

Figure 4:
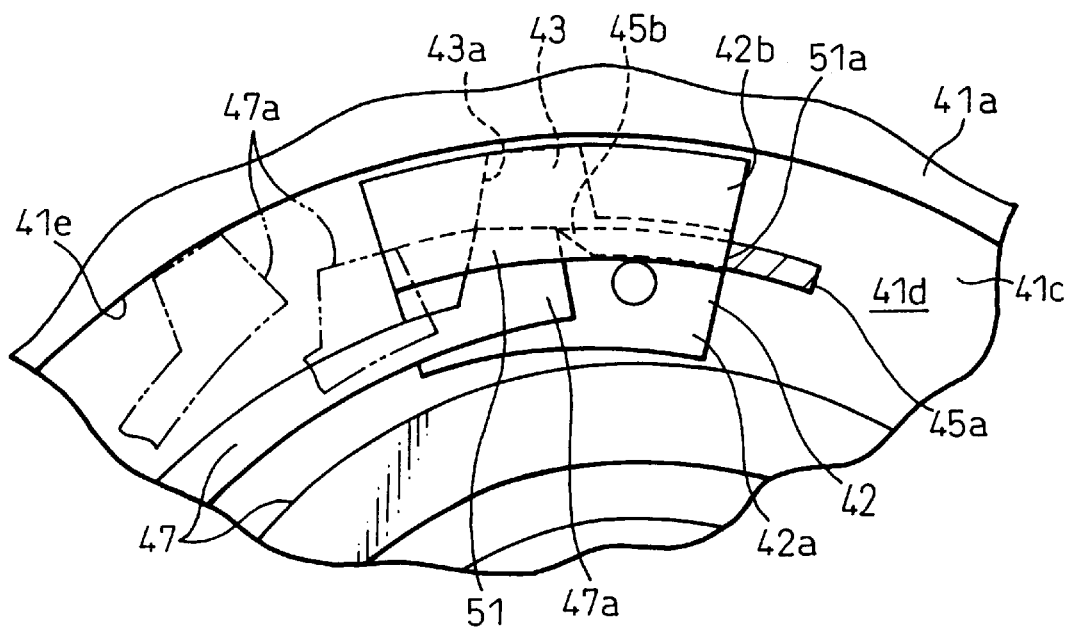
FIG. 4 is a similar view to FIG. 3, illustrating a further process of the interrupting operation thereof.

When the load torque of the refrigerant compressor increases beyond the predetermined limiting value due to any unpredictable cause of the refrigerant compressor (i.e., when an unpredictably excessive load torque is applied from the refrigerant compressor to the pulley assembly 18), an amount of torsion of the spiral springs 47 increases to increase a reduction in the diameter thereof, as shown in FIG. 4. Accordingly, the force acting on the outer ends 47a of the spiral springs 47 in the radially inward direction increases. Further, the radially inward force applied from the inclined power transmitting face 43a of the engaging element 42 to the outer ends 47a of the spiral springs 47 due to the torque transmitted from the inclined power transmitting face 43a to the outer ends 47a of the spiral springs 47 also increases. Furthermore, an increase in the relative rotation between the rotor element 41 and the drive shaft 16 occurs to increase a pressing force acting from the working ends 45b of the releasing projections 45a to the outer ends 47a of the spiral springs 47. Therefore, the outer ends 47a of the spiral springs 47 are moved radially inward to be detached from the power transmitting faces 43a of the engaging elements 42. As shown by two-dot-chain lines in FIG. 4, as soon as the outer ends 47a are detached from the power transmitting faces 43a, the outer ends 47a are further disengaged from the blocking faces 43b of the engaging elements 42, and are moved in the direction reverse to the rotating direction (refer to FIG. 2) of the pulley assembly 18 in response to the relative rotation between the rotor element 41 and the drive shaft 16. As a result, the elastic force stored in the spiral springs 47 to urge the spiral springs 47 per se in the frontward direction along the axis "L" is released.

In the described embodiment, the spiral springs 47 which are formed to be spiraled in a direction to reduce the diameter thereof in response to an increase in the load torque, the power transmitting faces 43a having an inclination with respect to the radial direction of the rotor element 41, and the releasing projections 45 having the working ends 45b, constitute in combination a force releasing means having a function to release the urging force exhibited by the afore-mentioned urging force applying means.

When the elastic force of the spiral springs 47 is released, the spiral springs 47 are permitted to return to their free conditions shown in FIG. 5 in which the springs 47 lie in the flat plane extending adjacent to the rear face of the disconnecting plate 45, and the outer ends 47a of the spiral springs 47 are axially moved away from the engaging elements 42 in a frontward direction parallel with the axis "L". Simultaneously, since the spiral springs 47 are also elastically moved radially outward to restore the maximum diameter thereof, the outer ends 47a thereof are moved radially outward to occupy the position as best shown in FIG. 5, and do not come into re-engagement with the engaging recesses 43 of the engaging elements 42. Namely, the spiral springs 47 are completely disengaged from the engaging recesses 43 of the engaging elements 42 to interrupt the transmission of the drive power from the rotor element 41 of the pulley assembly 18 to the drive shaft 16 of the refrigerant compressor. Accordingly, the unpredictably excessive load torque is removed by the pulley assembly 18, and is not transmitted to the vehicle engine 21.

From the foregoing description of the pulley assembly 18 of the drive power transmission apparatus, it will be understood that the spiral springs 47 are initially engaged in the engaging recesses 43 of the engaging elements 42 in a condition where the diameter thereof is torsionally deformed and reduced. Therefore, when the outer ends 47a of the spiral springs 47 are disengaged from the blocking faces 43b of the engaging elements 42, the elastic force of the spiral springs 47 to restore the basic diameter thereof acts so as to urge the outer ends 47a to be pressed against an inner cylindrical wall surface 41e in the course the outer ends 47a are axially moved frontward until the outer ends 47a depart from the rotor cavity 41d of the rotor element 41.

Nevertheless, if either the elastic force of the spiral springs 47 to urge the spiral springs 47 per se to be moved in the axially frontward direction is set small or a friction between the outer ends 47a of the spiral springs 47 and the inner cylindrical wall surface 41e of the rotor element 41 is unexpectedly large, the outer ends 47a of the spiral springs 47 cannot be smoothly separated from the inner cylindrical wall surface 41e of the rotor element 41. Thus, the outer ends 47a of the spiral springs 47 cannot be urged by their own elastic force to be fully moved axially frontward so that they completely depart from the rotor cavity 41d of the rotor element 41. Consequently, there might occur a case where an adequate function to interrupt the transmission of a drive power from the vehicle engine 21 to the drive shaft 16 cannot be exhibited by the pulley assembly 18 of the drive power transmission apparatus when an unpredictable increase in the load torque appears in the refrigerant compressor.

At this stage, it should be noted that a reason why the elastic force of the spiral springs 47 is set small is because, for example, when the spiral springs 47 are assembled in the engaging elements 42 of the rotor element 41, and when the elastic force stored in the spiral springs 47 which acts so as to urge the drive shaft 16 of the refrigerant compressor in an axially rearward along the axis "L" is set small, it is possible to set small the spring force of the coil spring 17 of the refrigerant compressor, which urges the drive shaft 16 axially frontward against the elastic force of the spiral springs 47. When the spring force of the coil spring 17 of the refrigerant compressor can be set small, the size of the coil spring 17 can be small so as to contribute to a reduction in the entire size of the refrigerant compressor.

Further, one of the reasons why the friction between the outer ends 47a of the spiral springs 47 and the inner cylindrical wall surface 41e of the rotor element 41 is large is because either the outer ends 47a of the spiral springs 47 or the inner cylindrical wall surface 41e of the rotor element 41 might not be subjected to a satisfactory surface treatment in order to curtail the production cost of the pulley assembly 18.

Figure 6A:
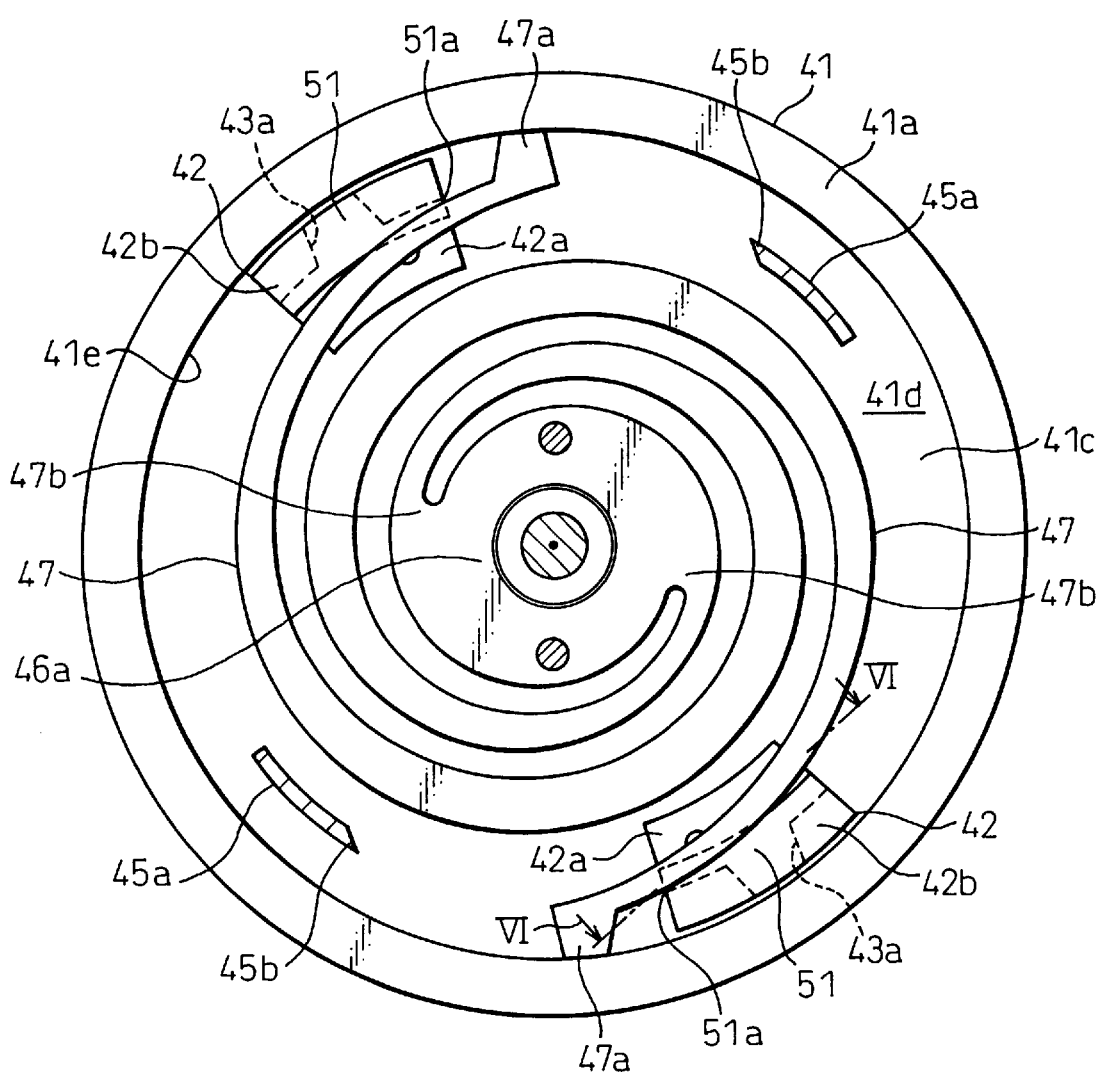
FIG. 6A is a similar view to FIG. 2, illustrating an elevation formed in the rotor element to promote a torque-transmission-interrupting operation of the drive power transmission apparatus of the first embodiment.
Figure 6B:
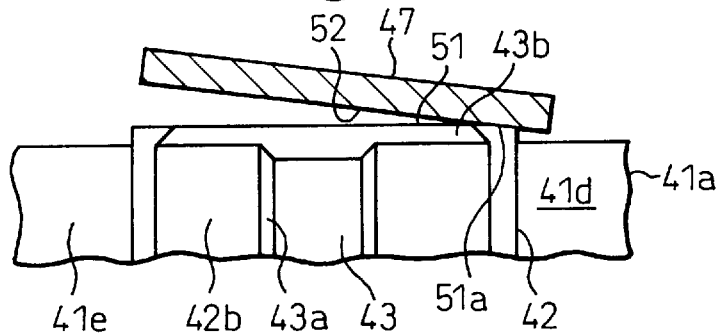
FIG. 6B is a cross-sectional view taken along the line VI—VI of FIG. 6A.

In order to ensure exhibition of the function to interrupt the drive power transmission by the pulley assembly 18 of the first embodiment of the present invention, the rotor element 41 of the pulley assembly 18 is provided with elevations 51 formed therein as geometrically elevated portions. The elevations 51 are formed integrally in the axially extending wall portion 42b of the pair of engaging elements 42 at the frontmost end thereof. More specifically, the elevations 51 are formed so as to extend radially inward from the frontmost ends of the axially extending wall portion 42b of the engaging elements 42. Further, the spiral springs 47 are provided with inclined guide faces 52 formed by the rear end faces of the respective spiral springs 47 which are inclined when the spiral springs 47 are elastically deformed in the axially rearward direction from their free conditions. Thus, as shown in FIGS. 6A and 6B, even when the outer ends 47a of the spiral springs 47 cannot be separated from the inner cylindrical wall surface 41e of the rotor element 41 and are kept stuck on the inner cylindrical wall surface 41e during the releasing of the excessive load torque of the refrigerant compressor by the pulley assembly 18, the spiral springs 47 come to ride on the elevations 51 during the relative rotation between the rotor element 41 (the engaging elements 42) and the drive shaft 16 (the spiral springs 47 attached to the drive shaft 16). More specifically, predetermined spiral portions of the spiral springs 47 which are arranged adjacent to the outer ends 47a thereof come into contact with corners 51a of the elevations 51 via the inclined guide face 52 of the predetermined portions of the spiral springs 47, and the predetermined portions are forced to be axially gradually moved in the frontward direction under the guide of the inclined guide faces 52 of the predetermined portions in response to the relative rotation between the rotor element 41 and the drive shaft 16. Accordingly, the outer ends 47a of the spiral springs 47 which are arranged adjacent to the above-mentioned predetermined portions are subsequently forced to be moved axially frontward until the outer ends 47a come to ride on the elevations 51 of the engaging elements 42. Therefore, the outer ends 47a are eventually separated from the inner cylindrical wall surface 41e of the rotor element 41, and are urged by the elastic force of the spiral springs 47 to come out of the rotor cavity 41d of the rotor element 41. Thus, the spiral springs 47 are allowed to surely recover their free condition shown in FIG. 5.

In the described embodiment, the pulley assembly 18 is provided with a pair of identical spiral springs 47 arranged to be spaced 180° apart from one another about the axis "L", and a cooperating pair of identical engaging elements arranged to be spaced 180° apart from one another about the axis "L". Thus, one of the pair of spiral springs 47 is engaged in an associated one of the pair of engaging elements 42 during the ordinary operation of the pulley assembly 18 of the drive power transmission apparatus. However, each of the spiral springs 47 comes to ride on the elevation 51 which is formed in the engaging element 42 different from the associated engaging element 42 in the course the releasing of the excessive load torque performed by the pulley assembly 18.

From the foregoing description of the first embodiment, it will be understood that the drive power transmission apparatus including the pulley assembly 18 can exhibit various advantages over the conventional apparatus as set forth below.

(1) When the excessive load torque appearing in the refrigerant compressor is released, the outer ends 47a of the spiral springs 47 engaged in the engaging elements 42 can be surely moved axially frontward to come out of the rotor cavity 41d. Therefore, the outer ends 47a are not kept sticky to the inner cylindrical wall surface 41e of the rotor element 41 and accordingly, do not continuously slide on the inner cylindrical wall surface 41e during the relative rotation of the rotor element 41 and the drive shaft 16. Thus, a cause for generating noise and vibration can be shortly removed. Further, when each outer end 47a is disengaged from the associated engaging element 42 and comes to ride on the elevation of the different engaging element 42, the outer end 47a is surely prevented from being re-engaged in the engaging recess 43 of the different engaging element 42.

Therefore, the releasing of the excessive load torque appearing in the refrigerant compressor can be surely achieved.

(2) Each of the spiral springs 47 is provided with the inclined guide face 52 which permits the spiral portion of the spiral spring 47 to smoothly ride on the elevation 51. Thus, the outer end 47a of the spiral spring 47 is permitted to be forcedly moved axially frontward in parallel with the axis "L". Accordingly, the riding of the outer ends 47a of the spiral springs 47 onto the elevations 51 are surely and smoothly achieved so as to promote the separation of the outer ends 47a from the inner cylindrical wall surface 41e of the rotor element 41.

(3) Since each of the engaging element 42 is produced separately from the rotor element 41 to be fixed to the annular disc portion 41c of the rotor element 41, and since the power transmitting face 43a, the blocking face 43b, and the elevations 51 are formed in each of the engaging element 42, the construction of the rotor element 41 can be simple enough to allow the rotor element 41 be easily produced.

(4) The spiral springs 47 are engaged in the rotor cavity 41d of the rotor element 41 by torsionally reducing their diameter until the outer ends 47a thereof are received and fitted in the engaging recesses 43 of the engaging elements 42. From this assembly construction of the spiral springs 47, the spiral springs 47 having their diameter (the afore-described radius R1) larger than the radius R2 of the rotor cavity 41d of the rotor element 41 can be intendedly employed and assembled in the pulley assembly 18 after they are torsionally deformed to reduce their diameter, in order to obtain advantages indicated below.

(4-1) When assembled, the outer ends 47a of the spiral springs 47 receive an elastic force in a radially outward direction which urges the outer ends 47a to be pressed against the inclined power transmitting faces 43a of the engaging elements 42. Therefore, when the vehicle engine 21 is stopped to stop the transmission of the drive power to the pulley assembly 18 of the drive power transmission apparatus, the outer ends 47a of the spiral springs 47 are not separated away from the power transmitting faces 43a of the engaging elements 42. Therefore, when the vehicle engine 21 is re-started, the outer ends 47a of the spiral springs 47 do not come into a strong contact with the power transmitting faces 43a of the engaging elements 42. Accordingly, generation of noise and vibration can be prevented.

(4-2) Since the spiral springs 47 having a diameter thereof (the radius R1) in their free condition which is very large compared with the diameter of the rotor cavity 41d of the rotor element 41 can be used by being accommodated in the pulley assembly 18 of the drive power transmission apparatus by torsionally reducing the diameter of the spiral springs 47, the design allowance of the pulley assembly 18, in particular the design allowance of the rotor element 41 and the engaging elements 42 can be increased. More specifically, according to the design principle of the first embodiment, the spiral springs are assembled in the rotor element 41 by torsionally deforming them to reduce the diameter thereof. Thus, with respect to a given diameter of the spiral springs 47 used for assembling the pulley assembly 18, it is possible to use the rotor element 41 having a smaller diameter than the case where the spiral springs 47 are assembled in the rotor element 41 without being torsionally deformed to reduce the diameter thereof. Namely, the smaller diameter rotor element 41 can be used by radially inwardly shifting the position of the engaging elements 42 when they are fixed to the rotor element 41 and by torsionally deforming the spiral springs 47. As a result, the size of the rotor element 41 of the drive power transmission apparatus can be reduced according to the present invention.

(5) Since the spiral springs 47 are torsionally deformed to reduce the diameter thereof about the axis "L" before they are assembled in the rotor element 41, the spiral springs 47 can function as an urging means for applying an elastic urging force to the spiral springs 47 per se. Therefore, it is possible to reduce the number of elements used for constructing the pulley assembly 18 of the drive power transmission apparatus. Accordingly, the simple construction of the drive power transmission apparatus as well as a reduction in the production cost of the same apparatus can be achieved.

(6) The inclined guide faces 52 are formed in the rear end faces of the spiral springs 47 to cooperate with the elevations 51 of the engaging elements 42 of the rotor element 41 to thereby promote the separation of the spiral springs 47 from the rotor cavity of the rotor element 41. Accordingly, no particular and separate guide elements are needed for the pulley assembly 18. Thus, the production of the drive power transmission apparatus can be simplified.

(7) The pair of spiral springs 47 are arranged to be diametrically opposed to one another with respect to the axis "L", and the pair of engaging elements 42 are also arranged to be diametrically opposed to one another with respect to the axis "L". Therefore, when one of the spiral springs 47 is disengaged from the associated one of the engaging elements 42 due to the generation of the unpredictable excessive load torque of the refrigerant compressor, the disengaged spiral spring 47 comes to ride on the elevation 51 which is provided for the engaging element 42 different from the associated engaging element 42 in response to the relative rotation between the rotor element 41 and the drive shaft 16 and as a result, the outer end 47a of the disengaged spiral spring 47 is permitted to surely and quickly come out of the rotor cavity 41d of the rotor element 41 during a rather small amount of relative rotation (approximately 180°) between the rotor element 41 and the drive shaft 16. Accordingly, it is possible to quickly prevent generation of noise and vibration which might be caused by the sliding of the outer ends 47a of the pair of spiral springs 47 on the inner cylindrical wall surface 41e of the rotor element 41.

On the other hand, if the pulley assembly 18 includes only a single spiral spring 47 and a single engaging element 42 to receive the spiral spring, only a single elevation 51 will necessarily be arranged in the engaging element 42. Therefore, a relative rotation over approximately 360° between the rotor element 41 and the drive shaft 16 will be required for permitting the outer end 47a of the spiral spring 47 to ride on the elevation 51 and to be separated from the rotor cavity 41d of the rotor element 41. Namely, an increased amount of relative rotation between the rotor element 41 and the drive shaft 16 is needed, compared with the described first embodiment of the present invention. Thus, it will be understood that the pulley assembly 18 of the first embodiment can be very effective for quickly separating the spiral springs 47 from the rotor element 41 to thereby promote interruption of transmission of the drive power from the vehicle engine 21 to the drive shaft 16 when the unpredictable excessive load torque appears in the refrigerant compressor. Thus, the transmission of the load torque from the refrigerant compressor to the vehicle engine can be quickly prevented.

Figure 7A:
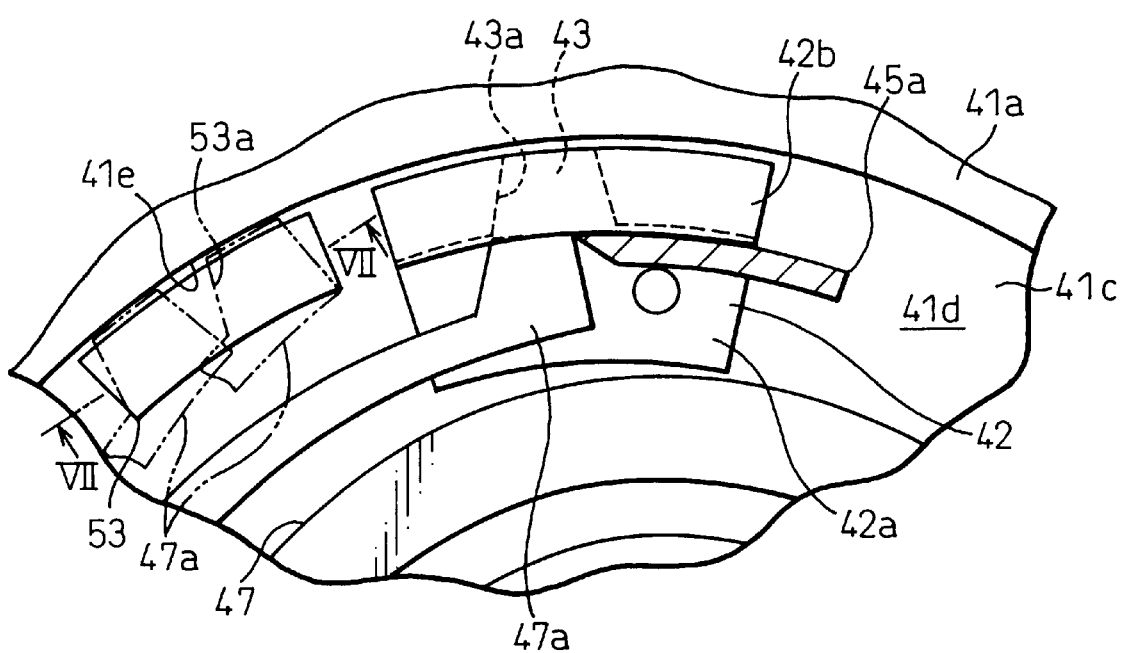
FIG. 7A is an enlarged partial view, similar to FIG. 4, of a rotor element assembled in a drive power transmission apparatus according to a second embodiment of the present invention, illustrating the operation to promote the torque-transmission-interruption carried out by an elevation formed in a rotor element of the drive power transmission apparatus according to the second embodiment.
Figure 7B:
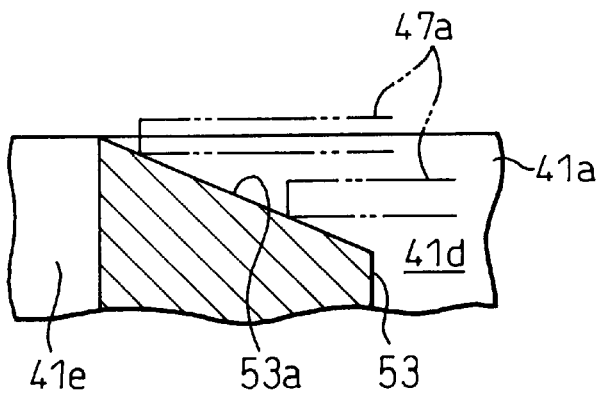
FIG. 7B is a cross-sectional view taken along the line VII—VII of FIG. 7A.
Figure 8:
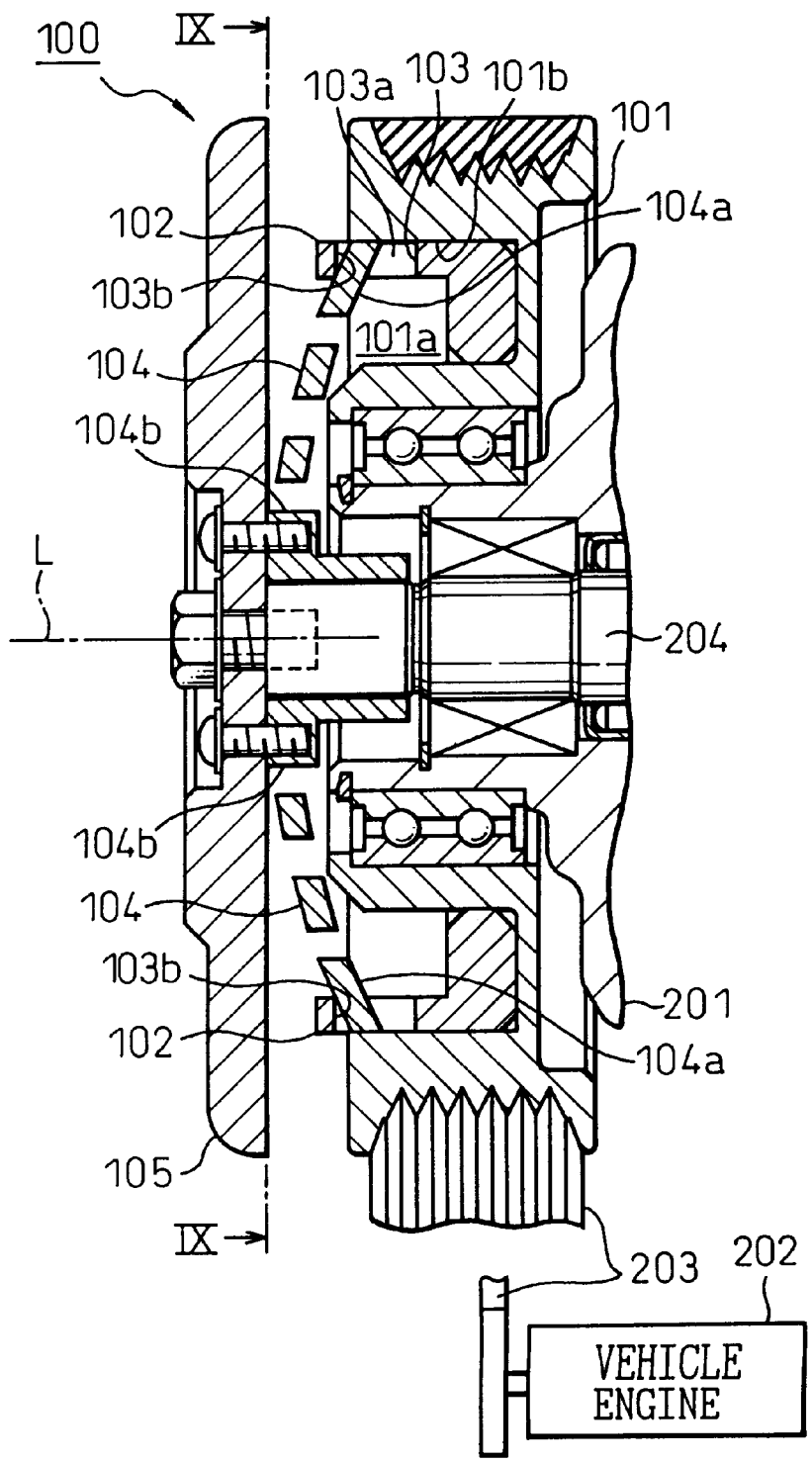
FIG. 8 is a cross-sectional view of a conventional drive power transmission apparatus.
Figure 9:
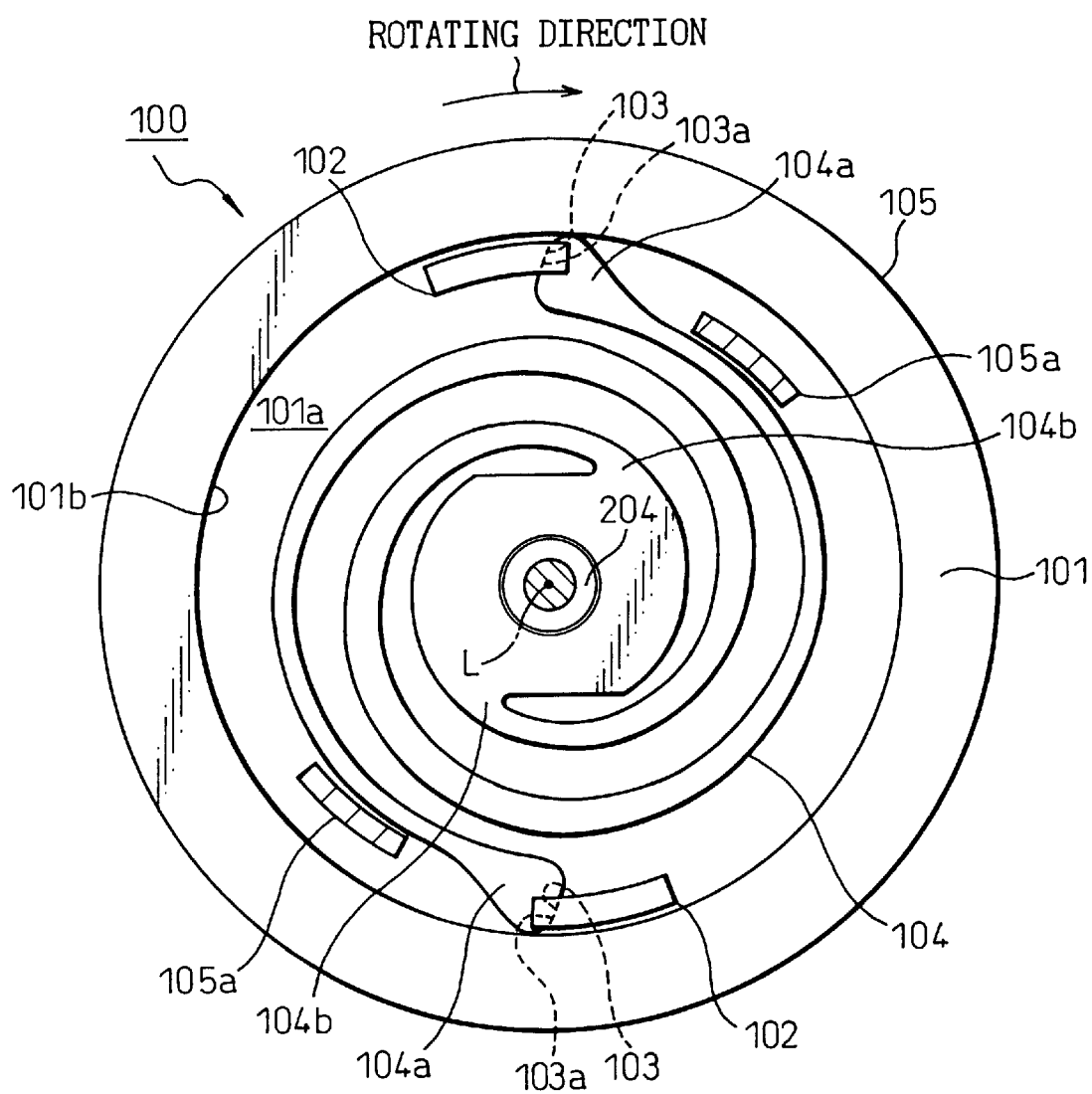
FIG. 9 is a view taken along the line IX—IX of FIG. 8, illustrating one side of a rotor element and spiral springs incorporated in the conventional drive power transmission apparatus.
Figure 10:
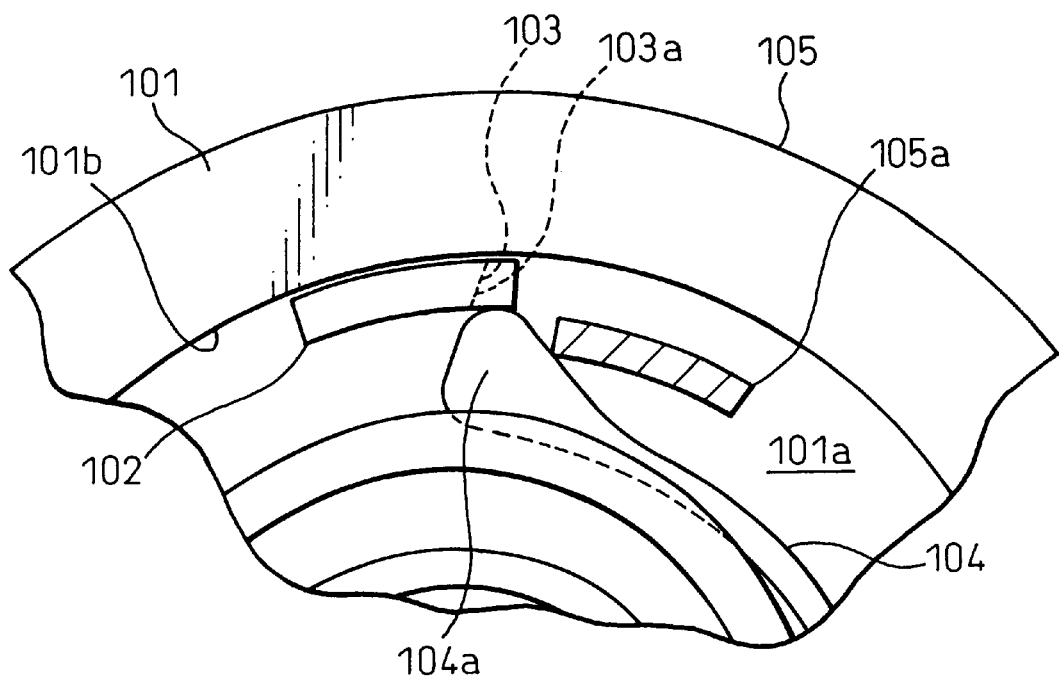
FIG. 10 is an enlarged partial view of a portion of the rotor element, illustrating the transmission-interrupting operation of the conventional drive power transmission apparatus.
Figure 11:
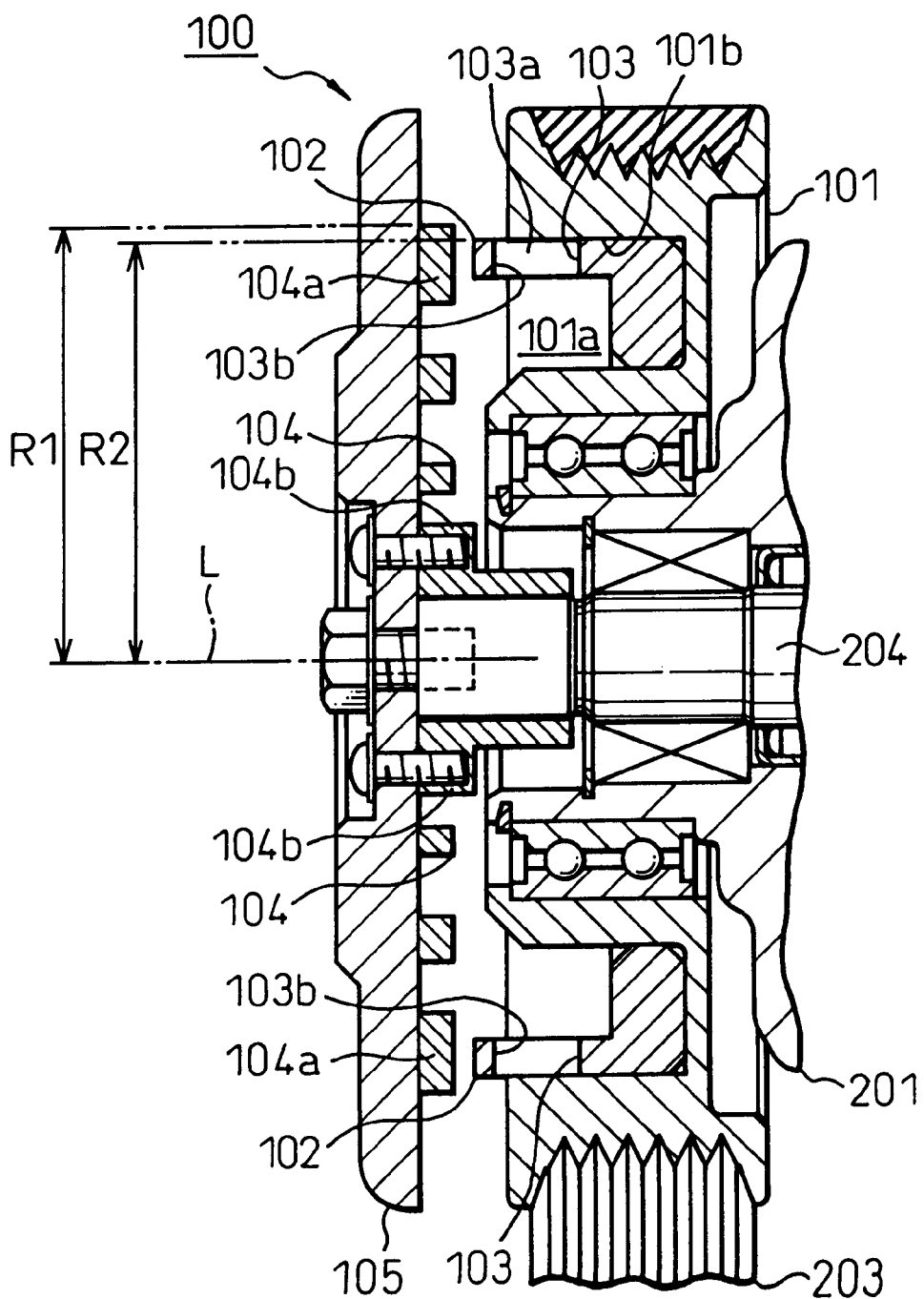
FIG. 11 is a cross-sectional view of the conventional drive power transmission apparatus, illustrating the transmission-interrupted operation thereof.
Figure 12A:
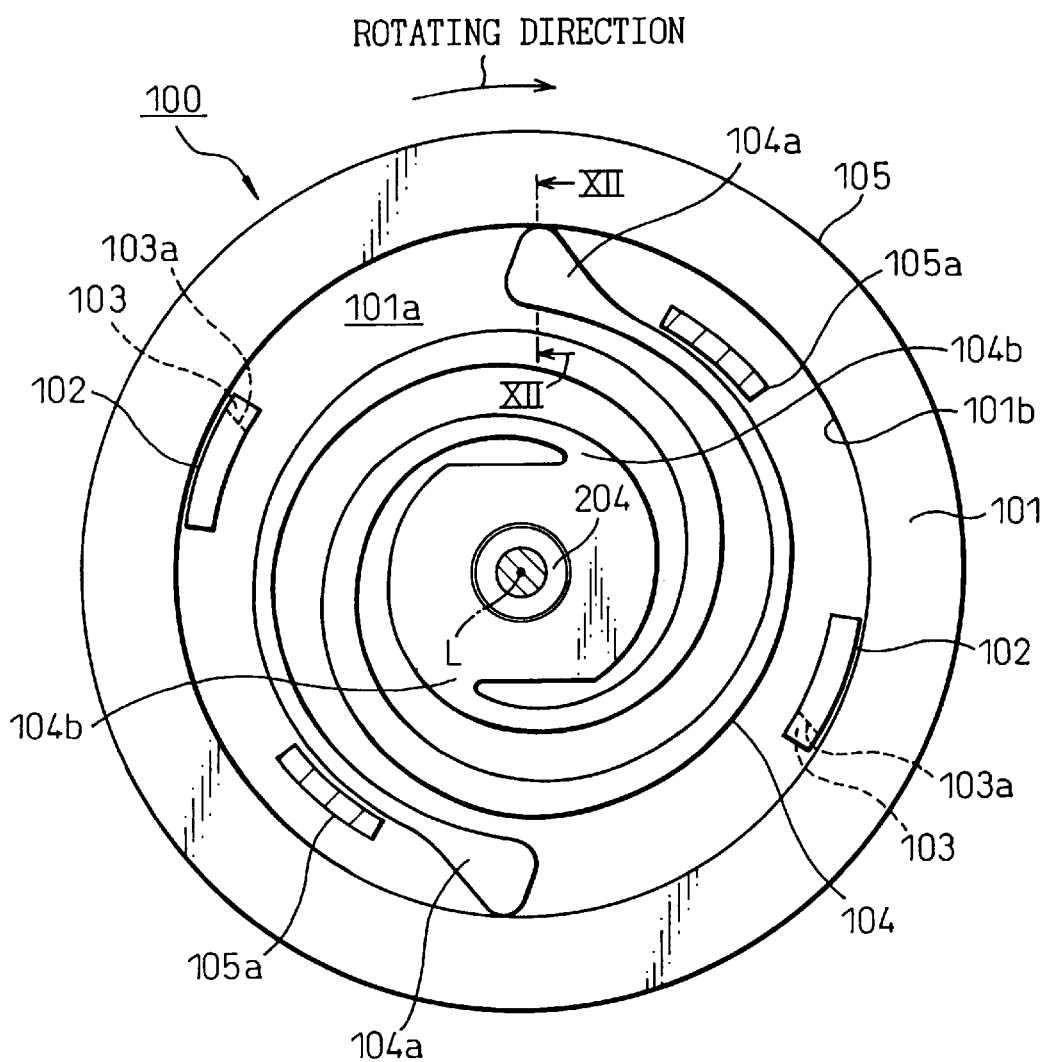
FIG. 12A is a similar view to FIG. 9, illustrating a condition in which the outer ends of the spiral springs are not separated from the inner wall surface of the rotor element of the conventional drive power transmission apparatus; and, FIG. 12B is a partial cross-sectional view, taken along the line XII—XII of FIG. 12A, of a portion of the rotor element and the outer end of the spiral spring.
Figure 12B:
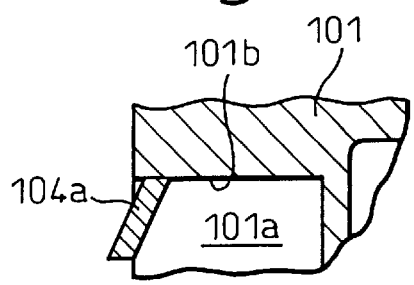

FIGS. 7A and 7B illustrate a drive power transmission apparatus according to a second embodiment of the present invention.

Referring to FIGS. 7A and 7B, the drive power transmission apparatus of the second embodiment is different from that of the described first embodiment in that each elevation 53 is arranged at a position angularly spaced apart from each engaging element 42. More specifically, the elevation 53 is formed as a separate member from the engaging element 42 and as a mechanical member forming an integral portion geometrically elevated from an annular disc portion 41c of a rotor element 41. Each elevation 53 is arranged to project from an inner face of the annular disc portion 41c into a rotor cavity 41d of the rotor element 41, and is located at a position adjacent to an outermost region of the rotor cavity 41d and spaced apart from the engaging element 42 in a direction reverse to the rotating direction of the rotor element 41. The elevation 53 is provided with an inclined face 53a as best shown in FIG. 7B. The inclined face 53a has an inclination formed in a circumferential direction with respect to the axis "L", and descends toward the engaging element 42.

In FIGS. 7A and 7B, two-dot chain lines indicate a moving process of an outer end 47a of one of the spiral springs 47 when the outer end 47a ascend the elevation 53 due to a relative rotation between the rotor element 41 and a drive shaft 16 (not shown in FIGS. 7A and 7B) during the releasing of an unpredictable excess load torque of a refrigerant compressor. The outer end 47a which is disengaged from the engaging element 42 but is held stuck to an inner cylindrical wall surface 41e comes in contact with a lower portion of the inclined guide face 53a and is eventually separated from the inner cylindrical wall face 41e of the rotor element 41 while it ascends the elevation 53 by the guidance of the inclined guide face 53a of the elevation 53 due to the relative rotation of the rotor element 41 and the drive shaft 16. Thus, the outer end 47a of the spiral spring 47 can be forcedly moved in the axially frontward to result in separation from the rotor cavity 41d of the rotor element 41.

From the foregoing description, it will be understood that, in the second embodiment, the elevations 53 are arranged at respective positions separate from one of the pair of engaging elements 42. Therefore, the elevations 53 can be arranged at positions without being affected by the positions of the engaging elements 42. Namely, the determination of the positions of the elevations 53 can be achieved independently from the position of the engaging elements 42. Thus, when the elevations 53 are arranged at positions relatively close to the engaging elements 42 in a direction reverse to the rotating direction, the outer ends 47a of the spiral springs 47 which are held stuck to the inner cylindrical wall surface 41e of the rotor cavity 41d of the rotor element 41 can be forcedly moved away in the axially frontward to depart from the rotor cavity 41d of the rotor element 41 in response to an appreciably small amount of relative rotation of the rotor element 41 and the drive shaft 16. Accordingly, a quick separation of the spiral springs 47 from the rotor cavity 41d of the rotor element 41 can be achieved to quickly stop generation of noise and vibration due to the sliding of the outer ends 47a on the inner cylindrical wall surface 41e of the rotor element 41.

Many variations and modifications to the described embodiments of the present invention as set forth below will be achieved without departing from the scope of the invention as claimed in the accompanying claims.

(i) More or less than two spiral springs 47 may be arranged in the pulley assembly 18. If a single spiral spring 47 is arranged, the entire construction of the pulley assembly 18 can be simplified. On the contrary, if three or more spiral springs 47 are arranged, it will be possible to cause the respective outer ends 47a of the spiral springs 47 to ride on the elevations due to a very small amount of relative rotation of the rotor element 41 and the drive shaft 16 when the outer ends 47a are disengaged from the associated engaging elements 42.

(ii) The described spiral spring 47 may be replaced with other types of springs such as a coil spring.

(iii) The pulley assembly 18 of the drive power transmission apparatus may accommodate therein an electromagnetic or solenoid clutch as required.

(iv) The described pulley assembly 18 of the drive power transmission apparatus may be incorporated in various piston-type refrigerant compressors other than the described swash plate type refrigerant compressor, such as a wobble plate type refrigerant compressor, a wave-plate type refrigerant compressor, and a double-headed-piston type refrigerant compressor. Further, the pulley assembly 18 may be incorporated in rotary type compressors such as a scroll type refrigerant compressor and a vane type refrigerant compressor.

(v) The drive power transmission apparatus of the present invention may be incorporated in a drive power-receiving unit other than the described refrigerant compressor driven by a vehicle engine. For example, the drive power receiving unit may be one of engine-driven auxiliary equipment such as a hydraulic pump accommodated in a hydraulic power-steering unit, and an alternator mounted on a vehicle.

It should be understood that the present invention may be further changed or modified by a person skilled in the art within the scope and spirit of the invention as claimed in the accompanying claims.

What we claim is:

1. A drive power transmission apparatus arranged between a drive power source and a drive-power-receiving unit to transmit a drive power from a first rotatable element provided for the drive source to a second rotatable element provided for the drive-power-receiving unit, comprising:

a power-transmitting face formed in a preselected one of the first and second rotatable elements to face toward a predetermined rotating direction of the preselected rotatable element;

a torsionally deformable spring element provided with a first outer end arranged to be in a contact engagement with the power-transmitting face of the preselected rotatable element and a second outer end fixedly connected to the other of the first and second rotatable elements, said torsionally deformable spring element being torsionally deformed by a load torque appearing in the drive-power-receiving unit during transmission of the drive power while permitting a relative rotation between the first and second rotatable elements;

an urging force applying means operative to apply an urge force to said first outer end of said torsionally deformable spring element in a direction to disengage said first outer end from said power-transmitting face;

a blocking face formed in said preselected rotatable element to block said first outer end of said torsionally deformable spring element when said first outer end is urged by said urging force applying means to be disengaged from said power-transmitting face;

a force releasing means for releasing the urging force of said urging force applying means when the load torque exceeds a predetermined limiting value, said force releasing means encouraging said torsionally deformable spring element to be torsionally deformed until said first outer end thereof is disengaged from said blocking face when the load torque exceeds said predetermined limiting value; and an elevation arranged in said preselected rotatable element for permitting said torsionally deformable spring element to ride thereon in response to the relative rotation between said first and second rotatable elements when said first outer end being disengaged from said blocking face cannot be separated from said preselected rotatable element by said urging force of said urging force applying means to thereby promote separation of said first outer end of said torsionally deformable spring element from said preselected rotatable element.

2. The drive power transmission apparatus according to claim 1, wherein said torsionally deformable spring element comprises at least one spiral spring member spirally extending from said second outer end fixed to said other of said first and second rotatable elements to said first outer end, said spiral spring member having a basic position in which said spiral spring member lies in a flat plane and being torsionally deformed from the basic position when said first outer end thereof is brought into the contact engagement with said power-transmitting face formed in said preselected rotatable element.

3. The drive power transmission apparatus according to claim 2, wherein said torsionally deformable spring element comprises a pair of spiral spring members arranged to be spaced 180° apart from one another about an axis of rotation about which said first and second rotatable elements rotate in said predetermined rotating direction, each of said pair of spiral spring members spirally extending from said second outer end fixed to said other one of said first and second rotatable elements to said first outer end, said pair of spiral spring members having a basic position in which said spiral spring members lie in the flat plane and being torsionally deformed from the basic position when said first outer ends of said pair of spiral spring members are brought into contact engagement with power-transmitting faces separately formed in said preselected rotatable element.

4. The drive power transmission apparatus according to claim 2, wherein said preselected rotatable element comprises a rotor element having an axis of rotation thereof and being provided with a rotor cavity formed therein to be enclosed by an inner cylindrical wall extending about said axis of rotation, said rotor cavity having an inner diameter smaller than an outer diameter of said spiral spring held in the basic position to thereby receive said spiral spring after being torsionally deformed to reduce said outer diameter thereof;

wherein said power-transmitting face is arranged in said rotor cavity of said rotor element for permitting said first outer end of said spiral spring received in said rotor cavity to be in the contact engagement therewith and allowing said urging force applying means to urge said first outer end of said spiral spring in an axial direction parallel with said axis of rotation of said rotor element; and, wherein said blocking face is arranged in said rotor cavity of said rotor element to block said first outer end of said spiral spring.

5. The drive power transmission apparatus according to claim 1, wherein said first rotatable element comprises a rotor element supported on a portion of said drive-power-receiving unit to be rotatable about an axis of rotation and provided with an outer annular rim operatively connected to said drive power source to receive the drive power and a rotor cavity formed therein and enclosed by an inner cylindrical wall surface and, wherein said second rotatable element comprises an intermediate member connected to a rotation-driven element of said drive-power-receiving unit and having a spring connecting portion to which said second outer end of said torsionally deformable spring element is fixedly connected.

6. The drive power transmission apparatus according to claim 5, further comprises:

at least one engaging element separate from and fixed to said rotor element of said first rotatable element, said engaging element being provided with at least said power-transmitting face and said blocking face formed therein, said power-transmitting face being formed so as to permit the drive power of said rotor element to be transmitted to said rotation-driven element via said torsionally deformable spring element when said load torque is less than said predetermined limiting value.

7. The drive power transmission apparatus according to claim 6, wherein said engaging element is further provided with said elevation integrally formed therein as a geometrically elevated portion having a face on which said torsionally deformable spring element rides.

8. The drive power transmission apparatus according to claim 7, wherein said torsionally deformable spring element comprises a spiral spring having a guide face formed therein permitting said spiral spring to smoothly ride on said geometrically elevated portion of said elevation.

9. The drive power transmission apparatus according to claim 6, wherein said elevation is arranged in said rotor cavity of said rotor element of said first rotatable element at a position spaced apart from said engaging element in a direction reverse to said predetermined rotating direction of said rotor element, said elevation comprising a geometrically elevated portion formed integrally with said rotor element and provided with an inclined guide face permitting said torsionally deformable spring element to gradually ascend said inclined guide face of said elevated portion in response to the relative rotation between said rotor element of said first rotatable element and said intermediate member connected to said rotation-driven element.

10. The drive power transmission apparatus according to claim 5, wherein said drive power source comprises a vehicle engine, and wherein said drive-power-receiving unit comprises a refrigerant compressor having a rotatable drive shaft forming said rotation-drive element.

* * * * *